US009869784B2

(12) United States Patent
Ollivrin

(10) Patent No.: US 9,869,784 B2
(45) Date of Patent: Jan. 16, 2018

(54) QUALITY CONTROL FOR BROADBAND SWEEPS

(71) Applicant: Sercel, Carquefou (FR)

(72) Inventor: Gilles Ollivrin, Nantes (FR)

(73) Assignee: SERCEL, Carquefou (FR)

( * ) Notice: Subject to any disclaimer, the term of this patent is extended or adjusted under 35 U.S.C. 154(b) by 624 days.

(21) Appl. No.: 14/282,480

(22) Filed: May 20, 2014

(65) Prior Publication Data

US 2015/0198728 A1 Jul. 16, 2015

Related U.S. Application Data

(60) Provisional application No. 61/925,823, filed on Jan. 10, 2014.

(51) Int. Cl.
$G01V\ 1/30$ (2006.01)
$G01V\ 1/00$ (2006.01)
$G01V\ 1/02$ (2006.01)

(52) U.S. Cl.
CPC .............. *G01V 1/307* (2013.01); *G01V 1/005* (2013.01); *G01V 1/02* (2013.01); *G01V 2200/14* (2013.01); *G01V 2210/1214* (2013.01)

(58) Field of Classification Search
CPC .......... G01V 1/005; G01V 1/02; G01V 1/307; G01V 2200/14; G01V 2210/1214
USPC ...... 702/14, 56, 96, 189, 84, 85; 367/14, 41, 367/47, 38
See application file for complete search history.

(56) References Cited

U.S. PATENT DOCUMENTS

| 4,782,446 | A | 11/1988 | Ehler et al. |
| 5,719,821 | A * | 2/1998 | Sallas ............ G01V 1/375 367/38 |
| 6,148,264 | A | 11/2000 | Houck et al. |
| 2011/0182143 | A1 | 7/2011 | Liu et al. |
| 2011/0305105 | A1 | 12/2011 | Dean |

(Continued)

FOREIGN PATENT DOCUMENTS

GB          1 500 958          2/1978

OTHER PUBLICATIONS

European Search Report in corresponding European Application No. EP 14 19 9925 dated Jul. 21, 2015. (References U.S. Pat. No. 6,148,264 and US 2011/182143 were previously cited in an Information Disclosure Statement submitted on May 20, 2014).

*Primary Examiner* — John H Le
(74) *Attorney, Agent, or Firm* — Patent Portfolio Builders PLLC

(57) ABSTRACT

A method for determining a quality control quantity corresponding to energy provided by a seismic source and related devices are provided. The method includes determining an envelope of a pilot signal associated with the seismic source; measuring a source signal of the energy provided by the seismic source; normalizing the pilot signal and the source signal using the determined envelope; and determining, in a processor, the quality control quantity using the normalized pilot signal and the normalized source signal. A control mechanism configured to implement the method includes a storage device holding data of a pilot signal associated with the seismic source; and a processor connected to the storage device and configured to carry out the method steps. A computer-readable medium having instructions to carry out steps of the method is also provided.

20 Claims, 6 Drawing Sheets

(56) References Cited

U.S. PATENT DOCUMENTS

2014/0247697 A1 9/2014 Bagaini
2015/0092517 A1 4/2015 Dellinger et al.

* cited by examiner

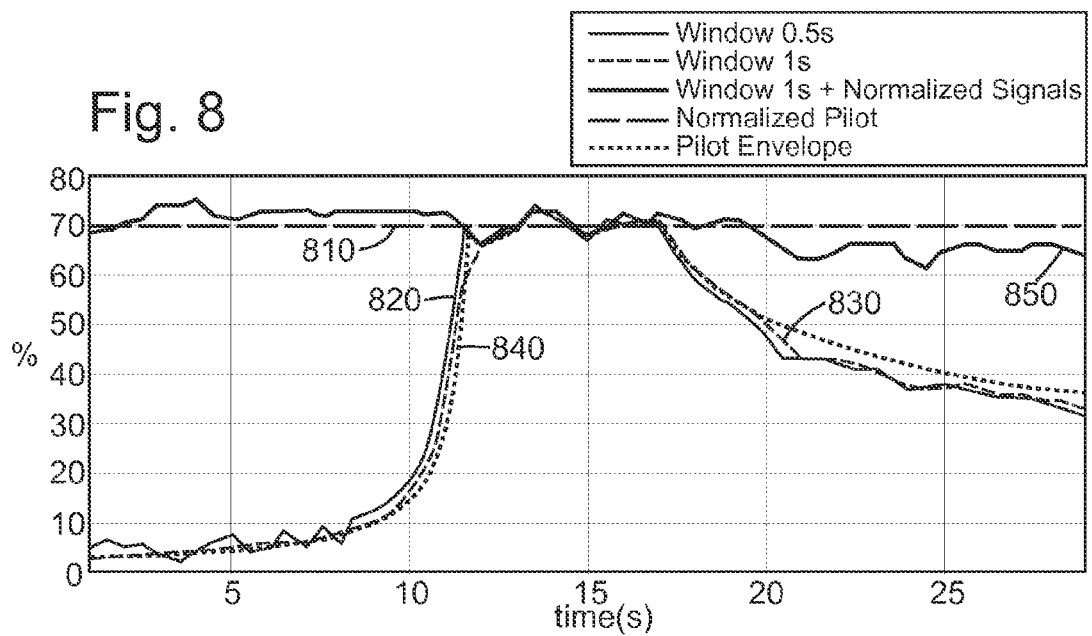
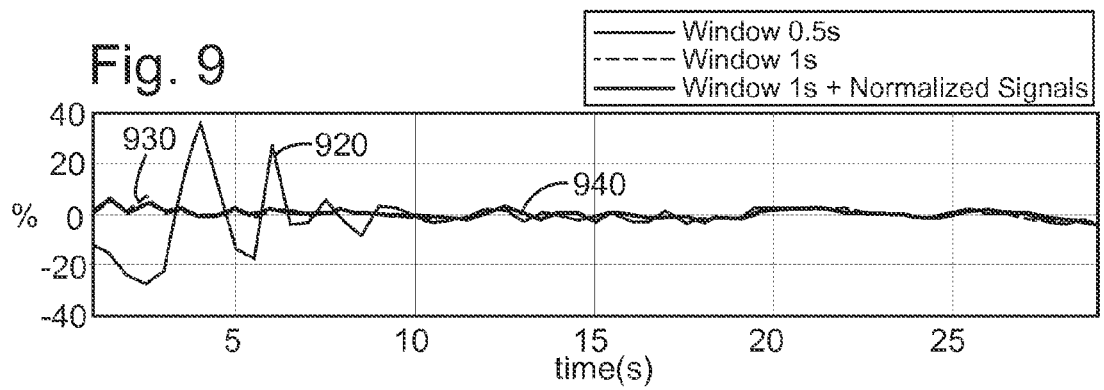
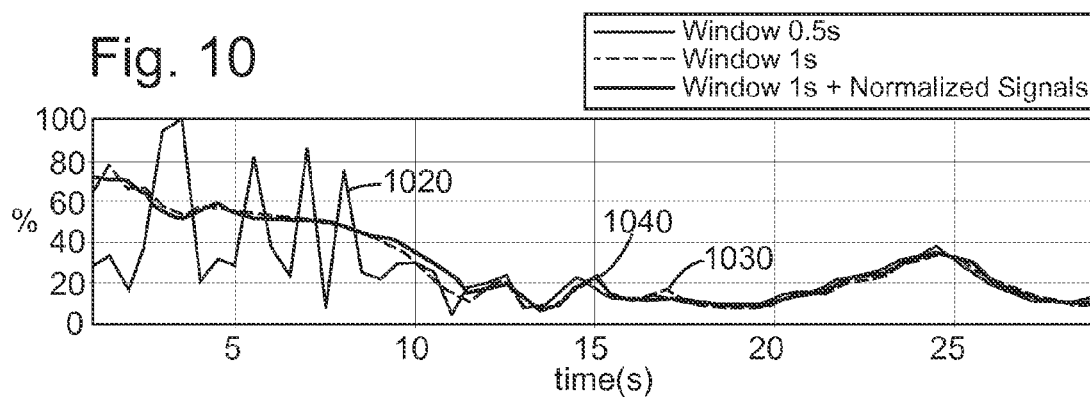

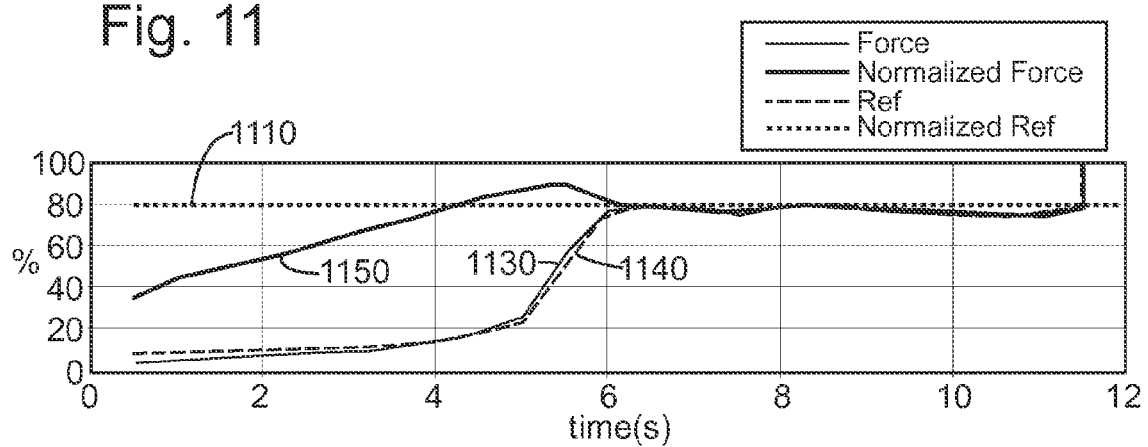

QUALITY CONTROL FOR BROADBAND SWEEPS

CROSS-REFERENCE TO RELATED APPLICATIONS

This nonprovisional application claims the benefit of U.S. Provisional Patent Application Ser. No. 61/925,823, filed Jan. 10, 2014 and entitled "Optimized quality control for broadband sweeps," which is incorporated herein by reference.

BACKGROUND

Technical Field

Embodiments of the subject matter disclosed herein generally relate to data processing for seismic surveying and, more particularly, to quality control data processing with respect to energy provided by a seismic source.

Discussion of the Background

Seismic exploration involves surveying subterranean geological formations, e.g., to locate hydrocarbon deposits in subterranean reservoirs. A survey typically involves deploying seismic source(s) and seismic sensors at predetermined locations. The sources generate seismic waves, which propagate into the geological formations. Subsurface features of the formations change the direction of propagation or other properties of incident seismic waves.

In reflection seismology, the seismic sensors detect reflections of the seismic waves off subsurface features or interfaces between features. The depth and the horizontal location of features causing reflections of seismic waves are estimated by measuring the time it takes for the seismic waves to travel from the seismic sources to the seismic sensors. Some seismic sensors are sensitive to pressure changes (e.g., hydrophones) and others are sensitive to particle motion (e.g., geophones, accelerometers). The sensors produce seismic data of the detected reflected seismic waves. Analysis of the seismic data can then indicate the presence or absence of probable locations of hydrocarbon deposits.

One type of seismic source is an impulsive energy source, such as dynamite for land surveys or a marine air gun for marine surveys. The impulsive energy source produces a relatively large amount of energy that is injected into the earth in a relatively short period of time. Another type of seismic source is a seismic vibrator, which is used in connection with a "vibroseis" survey. For a seismic survey that is conducted on land, the seismic vibrator imparts seismic waves into the earth at a relatively lower energy level than the signal that is generated by an impulsive energy source. However, the energy that is produced by the seismic vibrator lasts for a relatively longer period of time.

Excitation patterns for seismic vibrators are referred to herein as "pilot signals" and are generally designed before a seismic survey commences. Pilot signals are tuned (e.g., in duration and bandwidth) for specific predicted characteristics (e.g., moisture content) of the vibrator and the earth in the area being surveyed. However, the earth at the survey site may not have those characteristics. Differences between the actual and predicted characteristics can reduce the accuracy or usefulness of the survey data. Since surveys can be quite time-consuming, there is a need to determine as the survey progresses whether the data being collected are sufficiently accurate. This is referred to as "quality control" or "QC." For example, it is desirable to compare distortion, phase and fundamental amplitude between the ground force (the force applied by the source to the ground) and the pilot signal, or in general between a source signal representing the action of the source and the pilot signal. Moreover, recent advances in vibroseis technology permit designing vibroseis sweeps with frequency down to 1 Hz and up to 300 Hz, as opposed to the 8-80 Hz range of former sweeps. There is a need for improved QC able to analyze ground forces over such a frequency range in a way that permits results that can be readily interpreted by field personnel. There is also a need for QC usable during low-frequency ramp-ups and high-frequency ramp-downs.

U.S. Patent Application Publication No. 2011/0182143 by Liu et al., published Jul. 28, 2011, the entire content of which is incorporated herein by reference, describes that traditional seismic data quality control involves applying a linear regression analysis to the seismic data for purposes of sorting out noisy or weak seismic traces from the remaining traces. A linear trend is determined in trace amplitude versus sensor offset. The linear trend is used to reveal a geophysical trend of the raw shot gather and allows traces to be judged as relatively weak or noisy based on this trend. In this manner, thresholds can be constructed above and below the determined trend for purposes of constructing a filter to reject the noisy and weak traces that fall outside of these thresholds. However, this scheme can itself produce noisy data that is difficult to interpret in the field. Other schemes involve comparing the ground force signal to the pilot signal in corresponding 0.5 s windows of each signal. Reference is also made to U.S. Pat. No. 6,148,264 to Houck et al., issued Nov. 14, 2000, the entire content of which is incorporated herein by reference.

However, all these methods do not produce good quality QC data at low and high frequencies. There is, therefore, a continuing need for ways of analyzing energy provided by a seismic source to determine, during a survey, whether the data are accurate.

BRIEF DESCRIPTION

According to an embodiment, there is a method of determining a quality control quantity corresponding to energy provided by a seismic source, the method comprising: determining an envelope of a pilot signal (DF(t)) associated with the seismic source; measuring a source signal of the energy provided by the seismic source; normalizing the pilot signal (DF(t)) and the source signal using the determined envelope; and determining, in a processor, the quality control quantity using the normalized pilot signal and the normalized source signal.

According to another embodiment, there is a tangible, non-transitory computer-readable medium having stored computer program instructions that, when executed by a processor, cause the processor to carry out a method of determining a quality control quantity corresponding to energy provided by a seismic source, the method comprising: determining an envelope of a pilot signal (DF(t)) associated with the seismic source; measuring a source signal of the energy provided by the seismic source; normalizing the pilot signal (DF(t)) and the source signal using the determined envelope; and determining the quality control quantity using the normalized pilot signal and the normalized source signal.

According to yet another embodiment, there is a control mechanism configured to implement a method for determining a quality control quantity corresponding to energy provided by a seismic source, the mechanism comprising: a storage device holding data of a pilot signal (DF(t)) associated with the seismic source; and a processor connected to the storage device and configured to: determine an envelope of the pilot signal (DF(t)) using the stored data, measure a source signal of the energy provided by the seismic source, normalize the pilot signal (DF(t)) and the source signal using the determined envelope, and determine the quality control quantity using the normalized pilot signal and the normalized source signal.

BRIEF DESCRIPTION OF THE DRAWINGS

For a more complete understanding of the present invention, reference is now made to the following descriptions taken in conjunction with the accompanying drawings, in which:

FIG. 8 shows an example of a quality control plot in which the quality control quantity is an amplitude difference;

FIG. 9 shows an example of a quality control plot in which the quality control quantity is a phase difference;

FIG. 10 shows an example of a quality control plot in which the quality control quantity is a distortion;

FIG. 11 shows a further example of a quality control plot in which the quality control quantity is an amplitude difference.

DETAILED DESCRIPTION

The following description of the exemplary embodiments refers to the accompanying drawings. The same reference numbers in different drawings identify the same or similar elements. The following detailed description does not limit the invention. The following embodiments are discussed, for simplicity, with regard to the terminology and structure of a land-surface seismic surveying device. However, the embodiments discussed are not limited to that configuration, but may be used in other types of seismic surveys, such as towed marine survey systems or seabed cable survey systems.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Throughout this description, some embodiments are described in terms that would ordinarily be implemented as software programs. Those skilled in the art will readily recognize that the equivalent of such software can also be constructed in hardware, firmware, micro-code, or combinations of these with each other or with software. Given the systems and methods as described herein, software not specifically shown, suggested, or described herein that is useful for implementation of any embodiment is conventional and within the ordinary skill in such arts.

Figure 1:
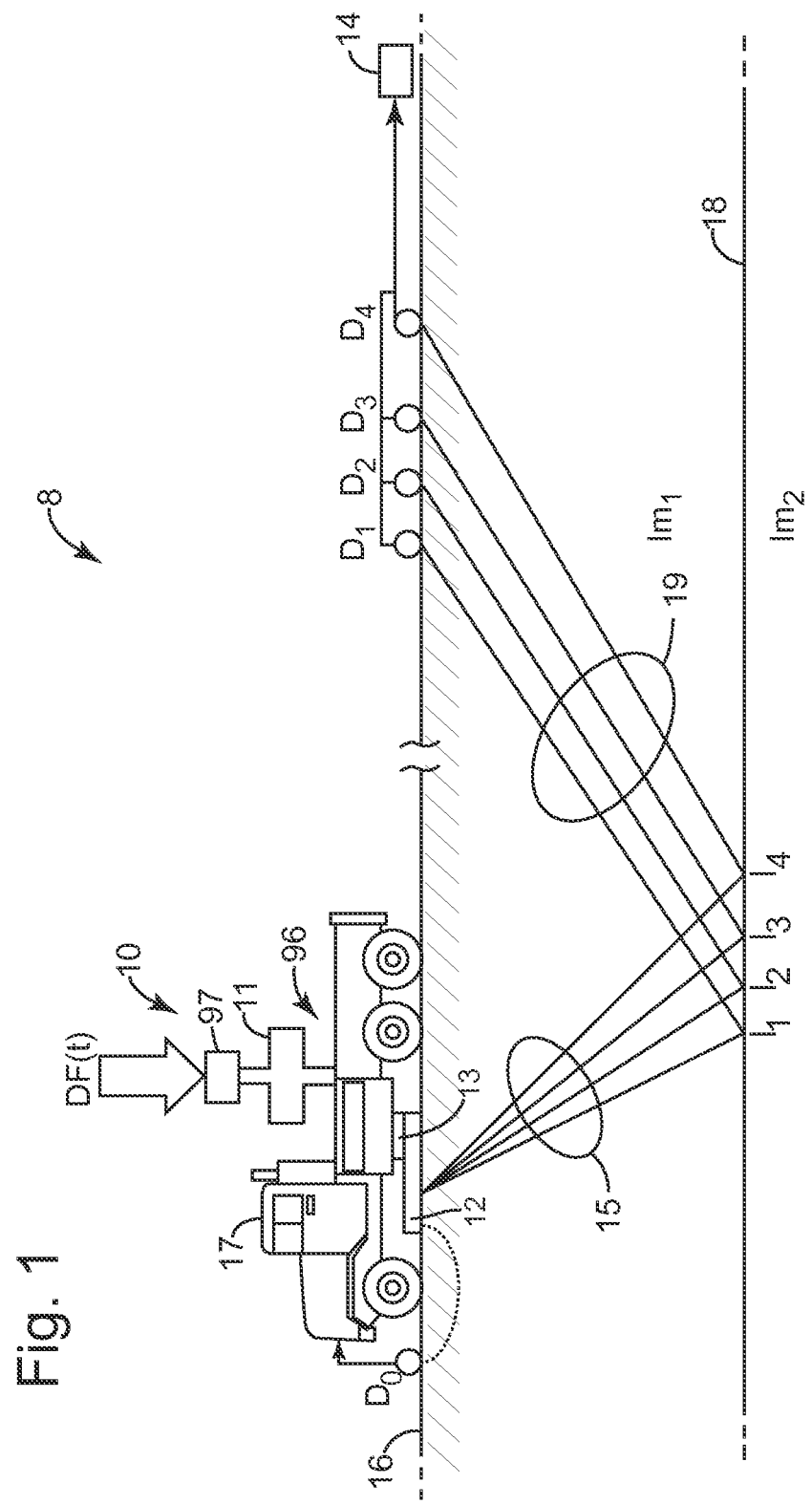
FIG. 1 is a schematic diagram of a vibroseis acquisition system according to an embodiment.

FIG. 1 shows an exemplary land-based vibroseis acquisition system 8 for conducting seismic surveys in accordance with some embodiments. Note that the embodiments disclosed herein equally apply to land or marine vibratory sources. The system 8 includes multiple seismic sources 10, one of which is depicted in FIG. 1. The seismic source 10 can be mounted on a truck 17 or other device permitting movement of the seismic source 10. System 8 includes surface-located geophones, e.g., $D_1$, $D_2$, $D_3$ and $D_4$, and a data acquisition system 14. In a marine survey, seismic source 10 can be towed behind a ship and hydrophones towed on streamers can be used for $D_1$, $D_2$, $D_3$ and $D_4$ instead of geophones. Throughout this disclosure, the term "target" refers to the ground, water, or other bulk mass into which seismic source 10 imparts energy. In the example shown, the seismic source 10 includes a seismic vibrator 96 including vibrating element 11 and base plate 12.

Seismic vibrator 96 also includes an actuator 97 (a hydraulic or electromagnetic actuator, as examples) that drives vibrating element 11 in response to a pilot signal (denoted "DF(t)" in FIG. 1) to produce seismic waves 15. The vibrating element 11 is coupled to a base plate 12 that is in contact with the earth surface 16, so the energy from the vibrating element 11 is coupled to the earth to produce the seismic waves 15.

Seismic vibrator 96 can include a sensing device 13 having sensors (e.g., accelerometers) to measure the motion of base plate 12. Sensing device 13 can be mounted or affixed to base plate 12. The measured motion of base plate 12 can be used to determine ground force, as discussed below.

In an example, the vibrating element 11 contains a reaction mass that oscillates at a frequency and amplitude that is controlled by the DF(t) pilot signal. The frequency of the DF(t) signal sets the frequency of oscillation of the reaction mass, and the amplitude of the oscillation, in general, is controlled by a magnitude of the DF(t) signal. The DF(t) signal can be, e.g., a sinusoid whose amplitude and frequency are changed over time so that the actuator 97 produces a "sweep," an actuation event that includes multiple frequencies at respective times during the sweep. During the generation of the sweep, the frequency of the DF(t) signal can transition (and thus, the oscillation frequency of the reaction mass can transition) over a range of frequencies, e.g., one frequency at time. The amplitude of the DF(t) signal may be linearly or non-linearly varied during the generation of the sweep pursuant to a designed amplitude-time envelope. An exemplary sweep pilot signal is discussed below with reference to FIG. 3.

An interface 18 between subsurface impedances $Im_1$ and $Im_2$ reflects the seismic waves 15 at points $I_1$, $I_2$, $I_3$ and $I_4$ to produce reflected seismic waves 19 that are detected by the geophones $D_1$, $D_2$, $D_3$ and $D_4$, respectively. The data acquisition system 14 gathers the raw seismic data acquired by the geophones $D_1$, $D_2$, $D_3$ and $D_4$ The raw seismic data can be processed to yield information about subsurface reflectors and the physical properties of subsurface formations.

The illustrated system uses sources and sensors on the surface. In other embodiments, seismic sources 10 and seismic sensors, such as geophones $D_0$, $D_1$, $D_2$, $D_3$, $D_4$, can be disposed in a borehole ("downhole"), or they can be buried just under the surface 16. Seismic sensors can be configured to record measurements produced by energy that is injected by borehole-disposed or shallowly-buried seismic sources 10 (e.g., seismic vibrator 96).

The seismic data measured by the geophones $D_1$, $D_2$, $D_3$ and $D_4$ represent transformations of the original seismic waves 15 from the seismic source 10 as those waves encounter subsurface features such as the $Im_1$-$Im_2$ boundary. In order to effectively infer the location and nature of subsurface features, it is preferable to know the character of the seismic waves 15 as well as the reflected seismic waves 19. As noted above, the ground characteristics at seismic source 10 may not always match predicted characteristics. For this and other reasons, it is desirable to determine quality control data representing the energy imparted into the earth or other target. The quality control data can include one or more quality control quantities, e.g., phase-difference or distortion values.

Figure 2:
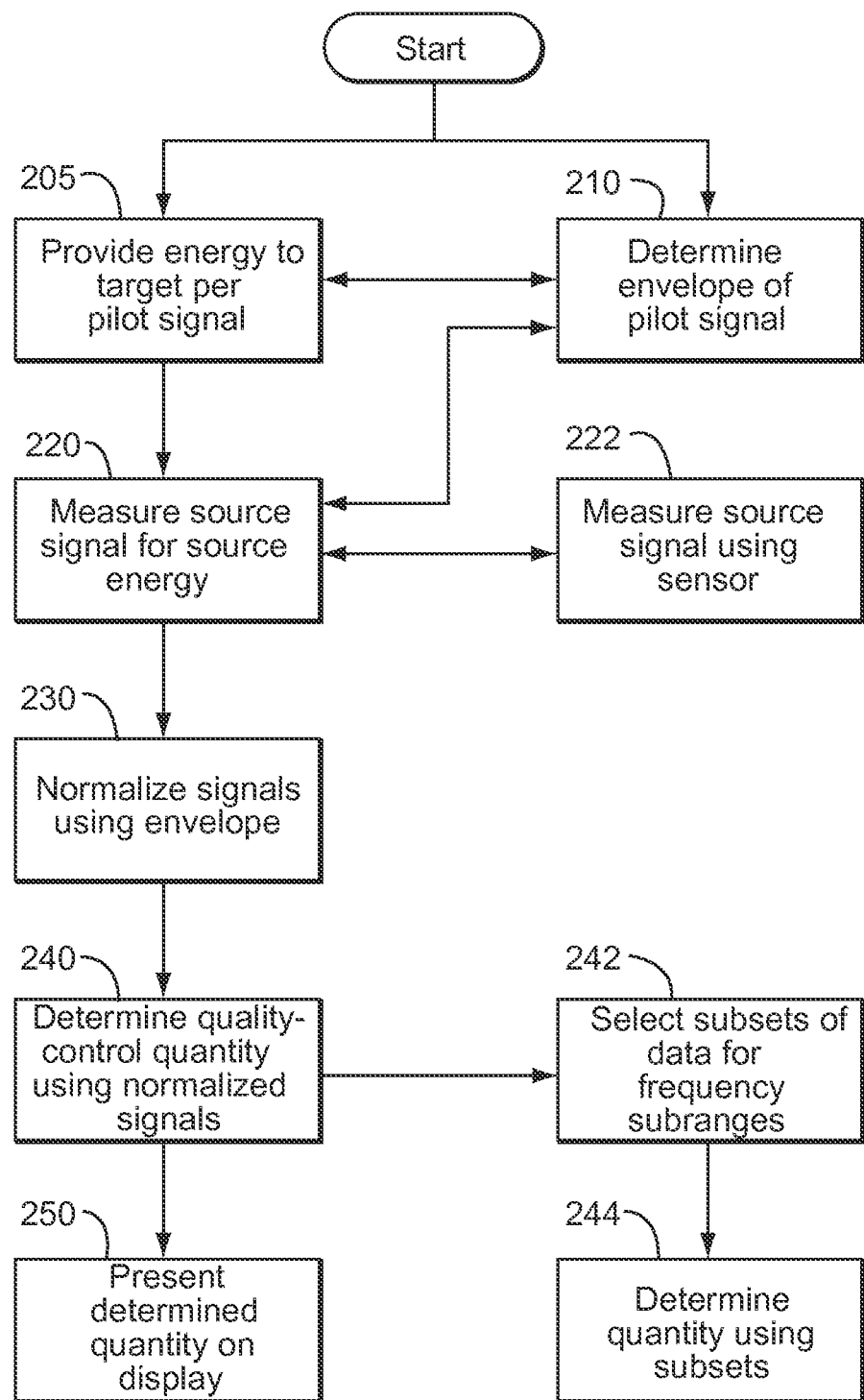
FIG. 2 is a flowchart of a method for determining a quality control quantity corresponding to energy provided by a seismic source according to an embodiment.

FIG. 2 shows a flowchart illustrating an exemplary method for determining a quality control quantity corresponding to energy provided by a seismic source. The steps can be performed in any order except when otherwise specified, or when data from an earlier step is used in a later step. In various examples, processing begins with step 210 or, as discussed below, with step 205. For clarity of explanation, reference is herein made to various components shown in FIGS. 1 and 12 that can carry out or participate in the steps of the exemplary method. It should be noted, however, that other components can be used; that is, exemplary method(s) shown in FIG. 2 are not limited to being carried out by the identified components. Moreover, examples of steps of the method are described below with reference to FIGS. 3-10.

In various embodiments, the seismic source includes a vibrator, e.g., vibrating element 11 (FIG. 1) and related components. The method further includes, before the measuring step 220, step 205. Either of steps 205 and 210 can be performed before the other.

In step 205, in various embodiments, energy corresponding to the pilot signal is provided to a target (e.g., earth or water) using the seismic source 10, e.g., base plate 12 driven by vibrating element 11 (all FIG. 1). Step 205 can precede or follow step 210, or be omitted.

Figure 4:
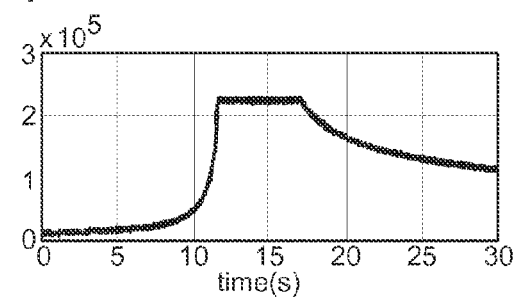
FIG. 4 is a plot of an exemplary envelope of the exemplary pilot signal of FIG. 3.

In step 210, an envelope of a pilot signal associated with the seismic source 10 is determined. An exemplary pilot signal is represented as DF(t) in FIG. 1. The pilot signal extends over a selected time span, and the envelope includes values representing the amplitude of the pilot signal at various times in the span, e.g., every 500 μs. The pilot signal can be, e.g., a drive signal for a seismic vibrator 96 (FIG. 1). FIG. 4, discussed below, shows an exemplary envelope of a pilot signal. The envelope can be determined by, e.g., connecting local maxima of the pilot signal, windowing the pilot signal and taking the highest value in each window, or using other techniques known in the mathematical art. The envelope can be determined automatically, without end-user input. This can make the process of QC using normalized data, as discussed below, transparent to the end user (e.g., vibroseis operator). Throughout this disclosure, envelopes are discussed with reference to the positive (least negative) extent of the pilot signal. However, negative (least positive) envelopes can also be used.

In step 220, a source signal of the energy provided by the seismic source is measured. An example of a source signal is a ground force signal as described above. This measurement can be done directly using data from sensing device 13 or indirectly using data from geophone $D_0$ or one or more of geophones $D_1$, $D_2$, $D_3$ or $D_4$ (all FIG. 1).

Figure 12:
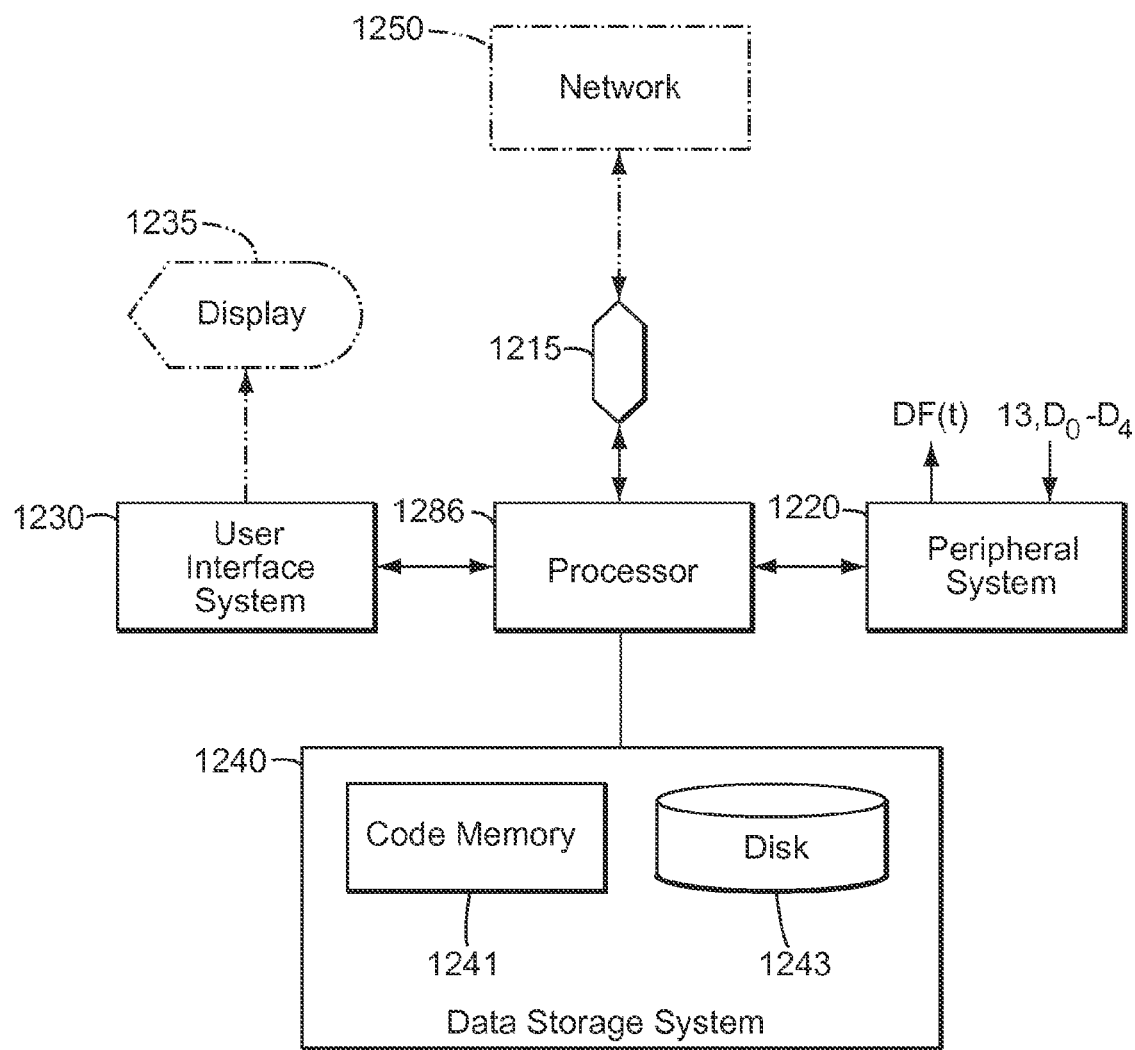
FIG. 12 is a high-level diagram showing the components of a control mechanism and related components.

In some embodiments using seismic vibrators 96 (FIG. 1), sensing device 13 provides acceleration data of base plate 12 (FIG. 1). The mass of base plate 12 is known, e.g., is stored in data storage system 1240 (FIG. 12). In general, force is the product of mass and acceleration. The ground force (e.g., down-going force) can be determined using the known mass and the measured acceleration as the mass-weighted sum of forces due to the baseplate and the reaction mass. Specifically, in these embodiments the measuring step 220 can include measuring acceleration of the seismic vibrator 96 over time and estimating the source signal (e.g., ground force signal) using the measured acceleration. The ground force GF can be computed as:

$$GF = massRM \times accRM + massBP \times accBP$$

for a reaction mass RM and a base plate BP.

In some embodiments using seismic vibrators 96, estimating step 220 includes measuring step 222. The source signal (e.g., ground force signal) is measured using a sensor, e.g., $D_0$ (FIG. 1). $D_0$ is disposed near seismic source 10 (e.g., having seismic vibrator 96). The dotted arrow in FIG. 1 represents the ground force exerted through base plate 12 traveling to sensor $D_0$ to be measured. This permits measuring the output ground force of the seismic vibrator 96, or an approximation thereof. The sensor can be, e.g., a surface-located or down-hole geophone or hydrophone.

In step 230, the pilot signal and the source signal are normalized using the determined envelope of the pilot signal. This can be done by, e.g., dividing the pilot signal by the determined envelope, and dividing the source signal by the determined envelope. An example is discussed below with reference to FIGS. 6 and 7.

In step 240, in a processor 1286 (FIG. 12), the quality control quantity is determined using the normalized pilot signal and the normalized source signal. Step 240 can include steps 242 and 244, discussed below. Step 240 can be followed by step 250.

In step 250, a visual representation of the determined quality control quantity is automatically presented on a display 1235 (FIG. 12) using the processor 1286. The visual representation can be a data plot such as those shown in FIGS. 8-10, discussed below. The visual representation can be presented, e.g., via graphical data-analysis software such as MATLAB.

FIGS. 3-10 show examples of quality control data and analysis, e.g., using steps described above with reference to FIG. 2. These plots correspond to an exemplary pilot signal including a frequency sweep from 1-180 Hz over the course of 30 s. The sweep includes a ramp-up in amplitude from 1 to 6 Hz and a ramp-down in amplitude from 100 Hz to 180 Hz.

Figure 3:
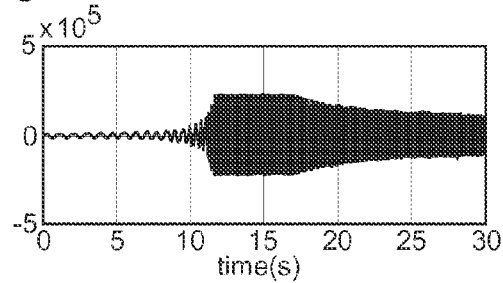
FIG. 3 is a plot of an exemplary pilot signal.

FIG. 3 is a plot of the exemplary pilot signal ("sweep"). The abscissa is time (seconds) and the ordinate is amplitude (arbitrary units). The frequency of the pilot signal increases over time, starting from very low frequencies, e.g., about 1 Hz before 5 s. Step 205 (FIG. 2) can include providing energy to the target corresponding to the illustrated pilot signal.

FIG. 4 is a plot of an exemplary envelope of the exemplary pilot signal shown in FIG. 3. The abscissa is time (seconds) and the ordinate is peak amplitude (arbitrary units). The envelope substantially encloses the positive values of the pilot signal, and represents the amplitude of the pilot signal but not the frequency thereof. Step 210 (FIG. 2) can include determining this envelope.

Figure 5:
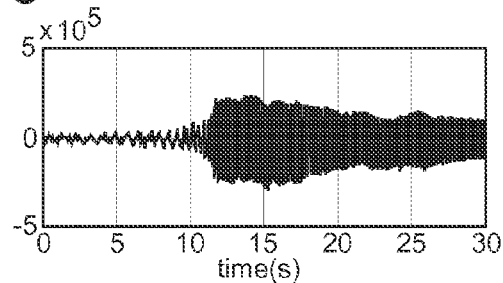
FIG. 5 is a plot of an exemplary estimated or measured ground-force signal.

FIG. 5 is a plot of an exemplary estimated or measured ground-force signal. The abscissa is time (seconds) and the ordinate is amplitude (arbitrary units). As can be seen, the ground force signal is similar but not identical to the pilot signal shown in FIG. 3. The ground force signal or other source signal can differ from the pilot signal due to variations in ground characteristics, as discussed above, or non-idealities in seismic source 10 (FIG. 1). Step 220 can include estimating this signal, or step 222 can include measuring this signal (both FIG. 2).

Figure 6:
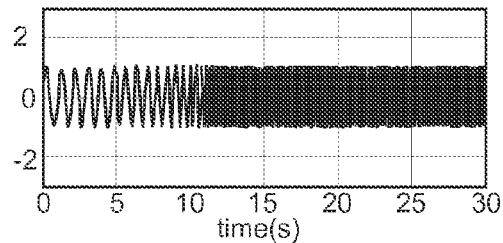
FIG. 6 is a plot of an exemplary normalized pilot signal computed from the exemplary pilot signal shown in FIG. 3.

FIG. 6 is a plot of an exemplary normalized pilot signal computed from the exemplary pilot signal shown in FIG. 3. The abscissa is time (seconds) and the ordinate is peak amplitude (arbitrary units). Each data point of the pilot signal in FIG. 3 was divided by the value of the envelope (FIG. 4) at that time to provide the corresponding data point of the normalized pilot signal (FIG. 6). As can be seen, the normalized signal has a peak amplitude of 1.0 (peak-to-peak amplitude of 2.0) everywhere. This is because the pilot signal was used to determine the envelope. This will often be the case, but some techniques for computing the envelope may result in the normalized pilot signal exhibiting small deviations from ±1. In general, the normalized pilot signal has a substantially constant amplitude. Step 230 (FIG. 2) can include producing this normalized pilot signal.

Figure 7:
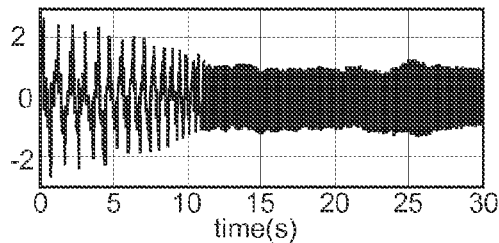
FIG. 7 is a plot of an exemplary normalized ground force signal computed from the exemplary ground force signal shown in FIG. 5 using the envelope shown in FIG. 4.

FIG. 7 is a plot of an exemplary normalized ground force signal computed from the exemplary ground force signal shown in FIG. 5 using the envelope shown in FIG. 4. The abscissa is time (seconds) and the ordinate is peak amplitude (arbitrary units). Step 230 (FIG. 2) can include producing this normalized ground force signal. As can be seen, the normalized ground force signal includes relatively higher values in the low-frequency portion of the pilot signal, less than about 12 s, than in the higher-frequency portion of the pilot signal. Normalizing the ground-force signal with the envelope of the pilot signal advantageously permits more readily determining how the ground-force signal relates to the pilot signal in regions where the pilot signal has a low amplitude.

The normalized ground force signal (FIG. 7) or other source signal can be produced or processed in various ways. In an embodiment, the normalized source signal can be produced for specific frequency ranges. In another embodiment, the normalized source signal can be processed in a windowed manner.

In embodiments producing the normalized ground force signal or source signal for specific frequency ranges, the pilot signal is associated with energy across a frequency range. Referring back to FIG. 2, determining-quantity step 240 can include steps 242 and 244.

In step 242, respective subsets of data associated with the normalized pilot signal and the normalized source signal are selected. Each subset corresponds to a sub-range of less than the entire frequency range. In various embodiments, the frequency range includes the range 1-150 Hz and the sub-range includes the range 1-30 Hz and/or the range 100 to 150 Hz.

In step 244, the quality-control quantity is determined using the selected respective subsets. Outside the subsets, non-normalized quality-control analysis can be used.

In embodiments processing the normalized source signal in a windowed manner, the determining-quantity step 240 (FIG. 2) includes determining respective values of the quality control quantity for each of a plurality of windows of the normalized source signal and the normalized pilot signal, the windows characterized by a selected window length. The selected window length can be, e.g., 0.5 s, 1.0 s, or at least one second, or two seconds, or more than two seconds. In these embodiments, the quality control quantity values can be plotted as a function of time for ready visualization and interpretation by field personnel conducting a seismic survey. Such plots are referred to herein as "quality control plots." The quality control quantity values can also be automatically processed, e.g., through statistical analysis.

FIG. 8 shows an example of a quality control plot in which the quality control quantity is a relative amplitude (ordinate, in percent), as a function of time (abscissa, in seconds), of a fundamental frequency component of the normalized source signal with respect to a fundamental frequency component of the normalized pilot signal. The preferred ground force is at 100% amplitude of the pilot signal across the full sweep. Trace 810 represents the normalized pilot, which has a substantially constant amplitude as noted above. Trace 810 peaks at 70% since 70% is the target drive level in this non-limiting example. That is, in this example, the pilot is intended to drive at most 70% of the force the vibrator is capable of emitting. Other target drive values can also be used. Traces 820 and 830 show comparative examples of quality control values for non-normalized ground-force signals. Trace 820 corresponds to a window length of 0.5 s and trace 830 corresponds to a window length of 1 s. For comparison, trace 840 shows the non-normalized pilot. As can be seen, especially before about 8 s, it can be difficult for survey personnel to visually analyze differences between the non-normalized pilot (trace 840) and the non-normalized measured data (traces 820, 830).

Trace 850 shows the normalized ground-force data, with a window length of 1 s. Comparing traces 850 and 810, field personnel can readily determine that the ground force was higher than intended during about the first 12 s of the sweep, and lower than intended during about the last 10 s of the sweep. Using normalized ground-force data advantageously provides survey personnel with more readily-understood information about the quality of the seismic-source energy (seismic waves 15, FIG. 1). Curve 850 provides QC information across the range of frequencies in the sweep, including during the low-frequency ramp-ups (<~12 s) and high-frequency ramp-down (>~17 s).

FIG. 9 shows an example of a quality control plot in which the quality control quantity is a phase difference (ordinate, in degrees), as a function of time (abscissa, in seconds), between the normalized pilot signal and the normalized ground force signal. Ideal phase is 0 deg. across the full sweep. Trace 920 shows non-normalized data with a window length of 0.5 s. As can be seen, this trace is very noisy in the low frequencies (up to about 10 s in this sweep). It can be difficult for field personnel to determine whether this noise is due to measurement, to computational error, or to, e.g., a property of the ground being surveyed, and thus whether or not corrective action should be taken in response to the noise. Trace 930 shows non-normalized data with a window length of 1 s. The noise is significantly reduced. Trace 940 shows normalized data with a window length of 1 s. The noise is further reduced compared to trace 930.

FIG. 10 shows an example of a quality control plot in which the quality control quantity is a distortion (ordinate, in percent), as a function of time (abscissa, in seconds) indicating differences between the normalized pilot signal and the normalized ground force signal. Ideal distortion is 0% across the full sweep. Trace 1020 corresponds to non-normalized data and a window length of 0.5 s, trace 1030 corresponds to non-normalized data and a window length of 1 s, and trace 1040 corresponds to normalized data and a window length of 1 s. As in FIG. 9, noise or computational error is reduced from trace 1020 to trace 1030, and is further reduced from trace 1030 to trace 1040. Normalizing data advantageously provides reduced noise and more readily-comparable results.

Table 1 shows data (arbitrary units) for the mean and peak fundamental amplitude (FIG. 8), phase (FIG. 9), and distortion (FIG. 10). Comparative values for a non-normalized QC process are shown. Inventive values for a normalized QC process described herein are also shown. As Table 1 shows, the mean and peak are closer together for the normalized (inventive) QC than for the comparative QC. This indicates using normalized data reduces noise or computation errors. Reduced noise or error permits field personnel to more readily determine whether action should be taken in response to the QC data.

TABLE 1

| QC type | Comparative | Inventive |
|---|---|---|
| Mean Ampl. | 36 | 70 |
| Peak Ampl. | 74 | 75 |
| Mean Phase | 6 | 1 |
| Peak Phase | 37 | 7 |
| Mean Dist | 26 | 30 |
| Peak Dist | 99 | 72 |

FIG. 11 shows a further example of a quality control plot in which the quality control quantity is an amplitude difference. This plot does not correspond to the pilot signal of FIGS. 3-10. Trace 1110 represents the normalized pilot, which has a substantially constant amplitude as noted above. In this non-limiting example, 80% is the target drive level. Trace 1130 shows a comparative example of quality control values, specifically, relative ground-force fundamental-frequency amplitudes, for a non-normalized ground-force signal. For comparison, trace 1140 shows the non-normalized pilot. As can be seen, especially between about 2 s and about 6 s, it can be difficult for survey personnel to visually analyze differences between the non-normalized pilot (trace 1140) and the non-normalized measured data (trace 1130).

Trace 1150 shows the normalized ground-force data. Comparing traces 1150 and 1110, field personnel can readily determine that the ground force was higher than intended during between about 4 s and about 6 s, and lower than intended during the other portions of the sweep.

FIG. 12 is a high-level diagram showing the components of a control mechanism configured to implement a method for determining a quality control quantity corresponding to energy provided by a seismic source and to perform other functions described herein, and related components. The system includes a processor 1286, a peripheral system 1220, a user interface system 1230, and a data storage system 1240. The peripheral system 1220, the user interface system 1230 and the data storage system 1240 are communicatively connected (e.g., wired or wirelessly) to the processor 1286. Processor 1286 can be communicatively connected to network 1250 (shown in phantom), e.g., the Internet, as discussed below. Devices 10, 11, 13, and 96 (all FIG. 1) can each include one or more of systems 1286, 1220, 1230, 1240, and can each connect to one or more network(s) 1250.

Processor 1286, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). Processor 1286 can implement processes of various embodiments described herein. Subsystems such as peripheral system 1220, user interface system 1230, and data storage system 1240 are shown separately from the processor 1286 but can be stored completely or partially within the processor 1286.

Data storage system 1240 can include or be communicatively connected with one or more processor-accessible memories configured to store information. In various embodiments, data storage system 1240 includes a storage device holding data of a pilot signal associated with the seismic source. The processor-accessible memories can be, e.g., within a chassis or as parts of a distributed system. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs).

In an example, data storage system 1240 includes code memory 1241, e.g., a RAM, and disk 1243, e.g., a tangible computer-readable rotational storage device such as a hard drive. Computer program instructions are read into code memory 1241 from disk 1243. Processor 1286 then executes one or more sequences of the computer program instructions loaded into code memory 1241, as a result performing process steps described herein. In this way, processor 1286 carries out a computer implemented process. For example, steps of methods described herein, blocks of the flowchart illustrations (e.g., FIG. 2) or block diagrams herein, and combinations of those, can be implemented by computer program instructions. Code memory 1241 can also store data in some embodiments.

Specifically, in various embodiments, processor 1286 is configured to determine an envelope of the pilot signal using the stored data from the storage device in data storage system 1240 (e.g., per step 210, FIG. 2), measure a ground force signal or other source signal of the energy provided by the seismic source (e.g., per step 220, FIG. 2), normalize the pilot signal and the source signal using the determined envelope (e.g., per step 230, FIG. 2), and determine the quality control quantity using the normalized pilot signal and the normalized source signal (e.g., per step 240, FIG. 2). The control mechanism can also include seismic source 10 having seismic vibrator 96 (both FIG. 1). Processor 1286 can be configured to cause the seismic source 10 to apply the energy corresponding to the stored data of the pilot signal to a target, e.g., the earth surface 16 or ocean water, e.g., by providing the DF(t) pilot signal via peripheral system 1220.

The peripheral system 1220 can include one or more devices configured to provide data to the processor 1286. For example, the peripheral system 1220 can receive data from sensing device 13 or geophones $D_0$, $D_1$, $D_2$, $D_3$ or $D_4$. The processor 1286, upon receipt of data from a device in or communicatively connected to the peripheral system 1220, can store such data in the data storage system 1240. In various embodiments, the control system includes sensing device 13 configured to measure the seismic vibrator 96 or the target. Processor 1286 can be configured to receive data from sensing device 13 and estimate the source signal using the received data.

As noted above, in various embodiments, seismic vibrator 96 includes base plate 12 configured to transmit the energy to the target and the sensing device 13 includes an accelerometer mounted to the base plate 12 and configured to provide acceleration data of the base plate 12. In various embodiments, the sensing device $D_0$ is arranged spaced apart from and in proximity to the seismic vibrator 96 and is configured to measure forces applied to the target by the seismic vibrator 96. Sensing device $D_0$ can include, e.g., a geophone or hydrophone depending whether the seismic source is a marine source or a land source.

The user interface system 1230 can include a mouse, a keyboard, another computer (connected, e.g., via a network or a null-modem cable), or any device or combination of devices from which data is input to the processor 1286. The user interface system 1230 also can include a display 1235, a processor-accessible memory, or any device or combination of devices to which data is output by the processor 1286. The user interface system 1230 and the data storage system 1240 can share a processor-accessible memory. In various embodiments, the processor 1286 is further configured to present a visual representation of the determined quality control quantity, e.g., a quality control plot, on the display 1235.

In various embodiments, processor 1286 is connected to network 1250 via communication interface 1215 (both shown in phantom). For example, communication interface 1215 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WIFI or GSM. Communication interface 1215 sends and receives electrical, electromagnetic or optical signals that carry digital or analog data streams representing various types of information to and from network 1250. Communication interface 1215 can be connected to network 1250 via a switch, gateway, hub, router, or other networking device.

Processor 1286 can send messages and receive data, including program code, through network 1250 and communication interface 1215. For example, a server (not shown) can store requested code for an application program (e.g., a JAVA applet) on a tangible non-volatile computer-readable storage medium to which the server is connected. The server can retrieve the code from the medium and transmit it through network 1250 to communication interface 1215. The received code can be executed by processor 1286 as it is received, or stored in data storage system 1240 for later execution.

Various embodiments herein include computer program products having computer program instructions stored on a tangible, non-transitory computer-readable medium, e.g., disk 1243. Such a medium can be manufactured as is conventional for such articles, e.g., by pressing a CD-ROM or writing a disk image to a hard drive. When the stored instructions are executed by processor 1286, those instructions cause processor 1286 to carry out functions, acts, or operational steps of various embodiments here. Stored instructions can execute, e.g., entirely on processor 1286, partly on processor 1286 and partly on a remote computer (not shown) connected to network 1250, or entirely on the remote computer.

In an example, the stored instructions cause processor 1286 to carry out a method of determining a quality control quantity corresponding to energy provided by a seismic source. The method comprises determining an envelope of a pilot signal associated with the seismic source (e.g., per step 220, FIG. 2); measuring a ground force signal or other source signal of the energy provided by the seismic source (e.g., per step 220, FIG. 2); normalizing the pilot signal and the source signal using the determined envelope (e.g., per step 230, FIG. 2); and determining the quality control quantity using the normalized pilot signal and the normalized source signal (e.g., per step 240, FIG. 2).

In various embodiments, the computer-readable medium further includes stored data representing a selected window length. The determining-quantity step of the method includes determining data values of the quality control quantity for each of a plurality of windows of the normalized source signal and the normalized pilot signal, the windows characterized by the selected window length. This is discussed above with reference to step 240 (FIG. 2). The selected window length can be at least one second. Moreover, the method can further comprise automatically presenting a visual representation of the determined quality control quantity on display 1235 using processor 1286 (e.g., per step 250, FIG. 2).

The disclosed exemplary embodiments provide ways of processing quality-control data. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter may include other examples that occur to those skilled in the art. Such other examples are intended to be within the scope of the claims.

What is claimed is:

1. A method of determining a quality control quantity corresponding to energy provided by a seismic source, the method comprising:
   driving the seismic source with a pilot signal (DF(t)) to apply a ground force to a surface of the earth;
   determining an envelope of the pilot signal (DF(t)) associated with the seismic source;
   measuring with a sensing device located at the seismic source, a source signal of the energy provided by the seismic source;
   normalizing the pilot signal (DF(t)) and the source signal using the determined envelope;
   determining, in a processor, the quality control quantity using the normalized pilot signal and the normalized source signal; and
   taking corrective action at the seismic source, based on the quality control quantity, to adjust the applied ground force.

2. The method of claim 1, wherein the quality control quantity is a phase difference between the normalized pilot signal and the normalized source signal as a function of time.

3. The method of claim 1, wherein the quality control quantity is a relative amplitude, as a function of time, of a fundamental frequency component of the normalized source signal with respect to a fundamental frequency component of the normalized pilot signal.

4. The method of claim 1, wherein the quality control quantity is a distortion indicating differences between the normalized pilot signal and the normalized source signal as a function of time.

5. The method of claim 1, wherein the determining-quantity step includes determining respective values of the quality control quantity for each of a plurality of windows of the normalized source signal and the normalized pilot signal, the windows characterized by a selected window length.

6. The method of claim 5, wherein the selected window length is at least one second.

7. The method of claim 1, wherein:
the seismic source includes a vibrator; and
the method further includes, before the measuring step, providing the energy to a target using the seismic source, the energy corresponding to the pilot signal (DF(t)).

8. The method of claim 1, wherein the seismic source includes a vibrator and the measuring step includes measuring acceleration of the vibrator over time and estimating the source signal using the measured acceleration.

9. The method of claim 1, further including automatically presenting a visual representation of the determined quality control quantity on a display using the processor.

10. The method of claim 1, wherein the seismic source is a marine source.

11. A tangible, non-transitory computer-readable medium having stored computer program instructions that, when executed by a processor, cause the processor to carry out a method of determining a quality control quantity corresponding to energy provided by a seismic source, the method comprising:
driving the seismic source with a pilot signal (DF(t)) to apply a ground force to a surface of the earth;
determining an envelope of the pilot signal (DF(t)) associated with the seismic source;
measuring with a sensing device located at the seismic source, a source signal of the energy provided by the seismic source;
normalizing the pilot signal (DF(t)) and the source signal using the determined envelope;
determining the quality control quantity using the normalized pilot signal and the normalized source signal; and
taking corrective action at the seismic source, based on the quality control quantity, to adjust the applied ground force.

12. The computer-readable medium of claim 11, further including stored data representing a selected window length, wherein the determining-quantity step of the method includes determining data values of the quality control quantity for each of a plurality of windows of the normalized source signal and the normalized pilot signal, the windows characterized by the selected window length.

13. The computer-readable medium of claim 12, wherein the selected window length is at least one second.

14. The computer-readable medium of claim 11, wherein the method further comprises automatically presenting a visual representation of the determined quality control quantity on a display using the processor.

15. A control mechanism configured to implement a method for determining a quality control quantity corresponding to energy provided by a seismic source, the mechanism comprising:
a storage device holding data of a pilot signal (DF(t)) associated with the seismic source;
a processor connected to the storage device and configured to:
drive the seismic source with the pilot signal (DF(t)) to apply a ground force to a surface of the earth;
determine an envelope of the pilot signal (DF(t)) using the stored data, and
a sensing device located at the seismic source to measure a source signal of the energy provided by the seismic source,
wherein the processor is further configured to:
normalize the pilot signal (DF(t)) and the source signal using the determined envelope,
determine the quality control quantity using the normalized pilot signal and the normalized source signal, and
take corrective action at the seismic source, based on the quality control quantity, to adjust the applied ground force.

16. The control mechanism of claim 15, further including the seismic source having a seismic vibrator, wherein the processor is further configured to cause the seismic source to apply the energy corresponding to the stored data of the pilot signal to a target.

17. The control mechanism of claim 16, further including a sensing device ($D_0$) configured to measure the seismic vibrator or the target, wherein the processor is further configured to receive data from the sensing device ($D_0$) and estimate the source signal using the received data.

18. The control mechanism of claim 17, wherein the seismic vibrator includes a base plate configured to transmit the energy to the target and the sensing device includes an accelerometer mounted to the base plate and configured to provide acceleration data of the base plate.

19. The control mechanism of claim 17, wherein the sensing device ($D_0$) is arranged spaced apart from and in proximity to the seismic vibrator and is configured to measure forces applied to the target by the seismic vibrator.

20. The control mechanism of claim 15, further including a display, wherein the processor is further configured to present a visual representation of the determined quality control quantity on the display.

* * * * *